United States Patent [19]
Ahn

[11] Patent Number: 5,179,479
[45] Date of Patent: Jan. 12, 1993

[54] METHOD OF HIGH SPEED SEARCHING FOR A DESIRED TAPE PORTION IN A DIGITAL AUDIO TAPE RECORDER

[75] Inventor: Hong-Cho Ahn, Kwangmyoung, Rep. of Korea

[73] Assignee: Samsung Electronics Co., Ltd., Suwon, Rep. of Korea

[21] Appl. No.: 534,257

[22] Filed: Jun. 7, 1990

[30] Foreign Application Priority Data

Jun. 10, 1989 [KR] Rep. of Korea ............... 8019/1989

[51] Int. Cl.⁵ .......................................... G11B 15/18
[52] U.S. Cl. ................................ 360/72.1; 360/72.2; 360/72.3; 369/50; 369/53
[58] Field of Search ............ 360/72.1, 72.2, 72.3; 369/47, 50, 53, 54

[56] References Cited

U.S. PATENT DOCUMENTS

| | | | |
|---|---|---|---|
| 4,377,826 | 3/1983 | Furuta | 360/72.1 |
| 4,411,008 | 10/1983 | d'Alayer de Costamore d'Arc et al. | 360/72.3 X |
| 4,723,181 | 2/1988 | Hickok | 360/72.2 |
| 4,989,104 | 1/1991 | Schülein et al. | 360/72.1 |
| 4,996,611 | 2/1991 | Ito | 360/72.3 |
| 5,021,896 | 6/1991 | Horino | 360/72.2 X |

FOREIGN PATENT DOCUMENTS

1-50264  2/1989  Japan ................................ 360/72.1
8505213 11/1985 World Int. Prop. O. ......... 360/72.2

Primary Examiner—Joseph L. Dixon
Assistant Examiner—David L. Robertson
Attorney, Agent, or Firm—Robert E. Bushnell

[57] ABSTRACT

A tape searching method in a digital audio tape recorder by means of TOC (table of contents) and operation frequency sensed from a reel motor. The method for tape searching includes a first stage for receiving a positional information and a specific search mode; a second stage for reading out the TOC information; a third stage for obtaining a mean value of an operational signal sensed from a take-up reel and another operational signal sensed from a supply reel so as to drive a reel motor with a high speed by counting time and position of the tape; a fourth stage for checking if amount of tape wound onto the reels is a value of desired position and conforming said third step if the tape amount is not the value of desired position; and a sixth stage for making a slow, precise search gradually so as to detect a start ID and terminating the procedure when the amount of tape wound onto the reels is a value of desired position.

4 Claims, 7 Drawing Sheets

FIG. 6

| FRAME | POINT | PROGRAM NUMBER | HOUR | MINUTE | SECOND | FRAME |
|---|---|---|---|---|---|---|
| n     | B0 | 16 | 00 | 00 | 00 | 00 |
| n+1   | A0 | 01 | 00 | 00 | 03 | 15 |
| n+2   | 01 | 01 | 00 | 00 | 03 | 15 |
| n+3   | 02 | 01 | 00 | 04 | 02 | 03 |
| n+4   | 01 | 02 | 00 | 07 | 15 | 08 |
| n+5   | 01 | 03 | 00 | 18 | 23 | 25 |
| n+6   | 02 | 03 | 00 | 23 | 56 | 12 |
| n+7   | 03 | 03 | 00 | 27 | 05 | 28 |
| n+8   | 01 | 04 | 00 | 32 | 08 | 01 |
| n+9   | 02 | 04 | 00 | 35 | 01 | 00 |
| n+10  | A1 | 01 | 00 | 36 | 15 | 09 |
| n+11  | C0 | 01 | 00 | 16 | 09 | 23 |
| n+12  | C1 | 02 | 00 | 18 | 23 | 24 |
| n+13  | C1 | 02 | 00 | 29 | 53 | 12 |
| n+14  | C1 | 03 | 00 | 32 | 08 | 30 |
| n+15  | C1 | 03 | 00 | 34 | 15 | 00 |
| n+16  | C1 | 16 | 00 | 35 | 00 | 32 |
| n+17  | B0 | 16 | 00 | 00 | 00 | 00 |
| n+18  | A0 | 01 | 00 | 00 | 03 | 15 |

ONE TOC INFORMATION

METHOD OF HIGH SPEED SEARCHING FOR A DESIRED TAPE PORTION IN A DIGITAL AUDIO TAPE RECORDER

BACKGROUND OF THE INVENTION

The present invention generally relates to a tape searching method in a digital audio tape recorder (hereinafter, referred to as DAT for short). More particularly, the invention relates to a high-speed searching for a desired tape portion by means of TOC (Table of Contents) and operation frequency of a reel motor.

Generally, a servo circuit used for the DAT system is employed to perform a tape searching function. Conventionally, the servo circuit is employed to perform a function of speed-variable play such as normal speed ($\times 1$), two-speed ($\times 2$), three-speed ($\times 3$), five-speed ($\times 5$), nine-speed ($\times 9$) and sixteen-speed ($\times 16$) play and high speed searching of one-hundred-speed ($\times 100$) and two-hundred-speed ($\times 200$). However, a demand for tape searching faster than the two-hundred-speed play arises gradually, as the technique in the DAT system is advanced. Particularly, in order to read out data stored in the data-storage tape with higher speed, there arise a need to search the tape with a speed higher than the two-hundred-speed.

But, in the case where a tape searching faster than two-hundred-speed is enforced according to the method heretofore in use, it is very difficult to detect a start ID (identification) of each program written in the tape, while keeping the relative velocity of the drum constant. As wherein, the relative velocity is found by following a procedure causing undesirable drawbacks.

Hereinafter, the problems of the prior DAT system, which occurred during fast tape searching will be explained assuming that the DAT system has a drum diameter of 30 mm, a rotational speed of 2000 rpm (in normal play), a tape running speed of 8.15 mm/sec and a track pattern (still) slope of 6°22'.

When a fast forward (hereinafter called FF for short) search is made at two-hundred-speed ($\times 200$) play, the relative velocity VR of the drum is given as $$VR = X \cdot Vd \cdot \cos\theta - 200Vt \quad (1)$$

Wherein, X represents a magnification factor of the present drum speed against the normal drum speed, Vd normal speed of the drum and Vt normal tape running time.

In order to obtain the magnification factor X, if the left term of Equation (1) is substituted by a normal drum speed, then $$Vd \cdot \cos\theta - Vt = X \cdot Vd \cdot \cos\theta - 200Vt \quad (2)$$

From the above Equation (2), the magnification factor X can be obtained as $$X = 1 + \frac{199Vt}{Vd \cdot \cos\theta} \approx 1.52 \quad (3)$$

In Equation (2), it is noted that the number of drum rotations is 1.52 times that of the normal speed, which is 3040 rpm, if the tape is searched at two-hundred-speed FF search mode.

Conversely, when a rewind (hereinafter, called RWD for short) search is made at two-hundred-speed ($\times 200$), the tape running speed Vt becomes negative number. Therefore, the number of drum rotations for keeping the relative velocity VR constant must be 960 rpm upon the basis of the following Equations (4) and (5).

$$VR = X \cdot Vd \cdot \cos\theta + 200Vt \quad (4)$$

$$X = 1 - \frac{201Vt}{Vd \cdot \cos\theta} \approx 0.48 \quad (5)$$

For a three-hundred-speed ($\times 300$) FF search, the magnification factor X must be $X \approx 1.78$ in the same way, the number of drum rotation must be about 3,560 rpm with $X \approx 1.78$ and, when a search is made at three-hundred-speed ($\times 300$) RWD, the number of drum rotation must be about 420 rpm with $X \approx 0.2146$.

Considering such a point, the performance of a drum motor is limited to a specific speed, as well illustrated in FIG. 2. That is to say, if the tape searching is made at or close to the four-hundred-speed ($\times 400$) RWD mode, the drum must be rotated backwardly theoretically. In practice, however, it is impossible for the drum to do so. It is also difficult to make a high speed search by correcting only the relative velocity of drum in such a case, and problems arise as to how to contrive another method of searching the tape with high speed.

SUMMARY OF THE INVENTION

Therefore, it is an object of the present invention is to provide a method of high speed searching for a desired tape portion in an digital audio tape recorder, by means of TOC (table of contents) and FG (frequency generator).

BRIEF DESCRIPTION OF THE DRAWINGS

For a better understanding of the invention and to show how the same may be carried into effect, reference will now be made, by way of example, to the accompanying diagrammatic drawings, in which:

FIG. 6 is an illustration of TOC (table of contents) information.

DETAILED DESCRIPTION OF THE INVENTION

A detailed description of a preferred embodiment taken according to the present invention will now be given hereinafter with reference to the drawings attached hereto.

Figure 1:
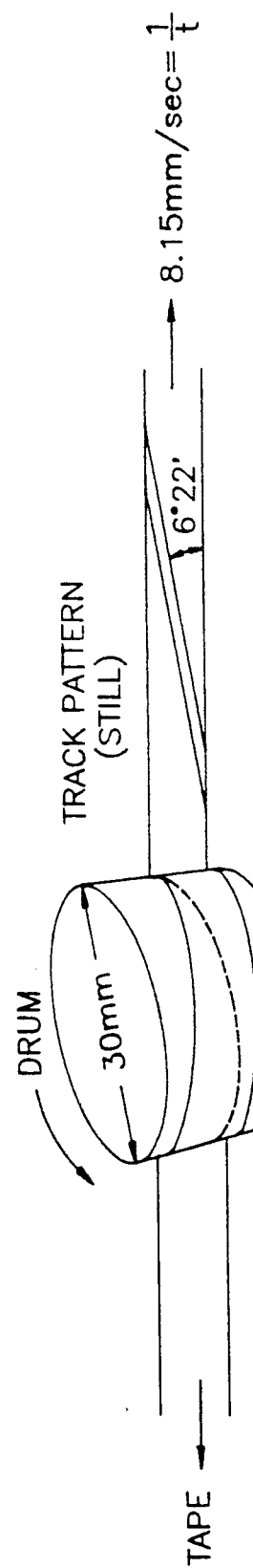
FIG. 1 is an illustration of drum motor velocity correction.
Figure 2:
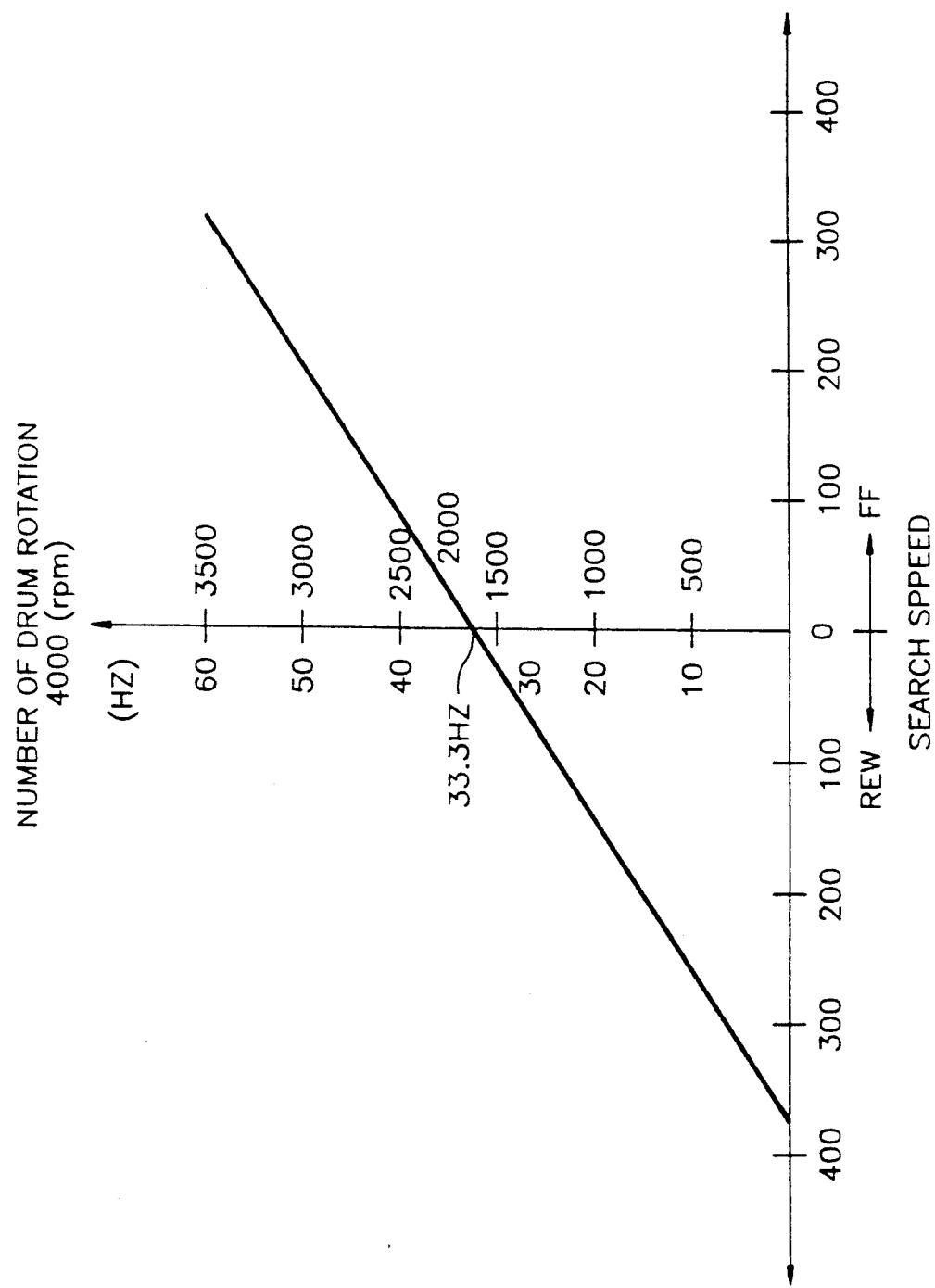
FIG. 2 is a graph for showing relation between the speed of drum rotation and tape searching velocity.
Figure 3:
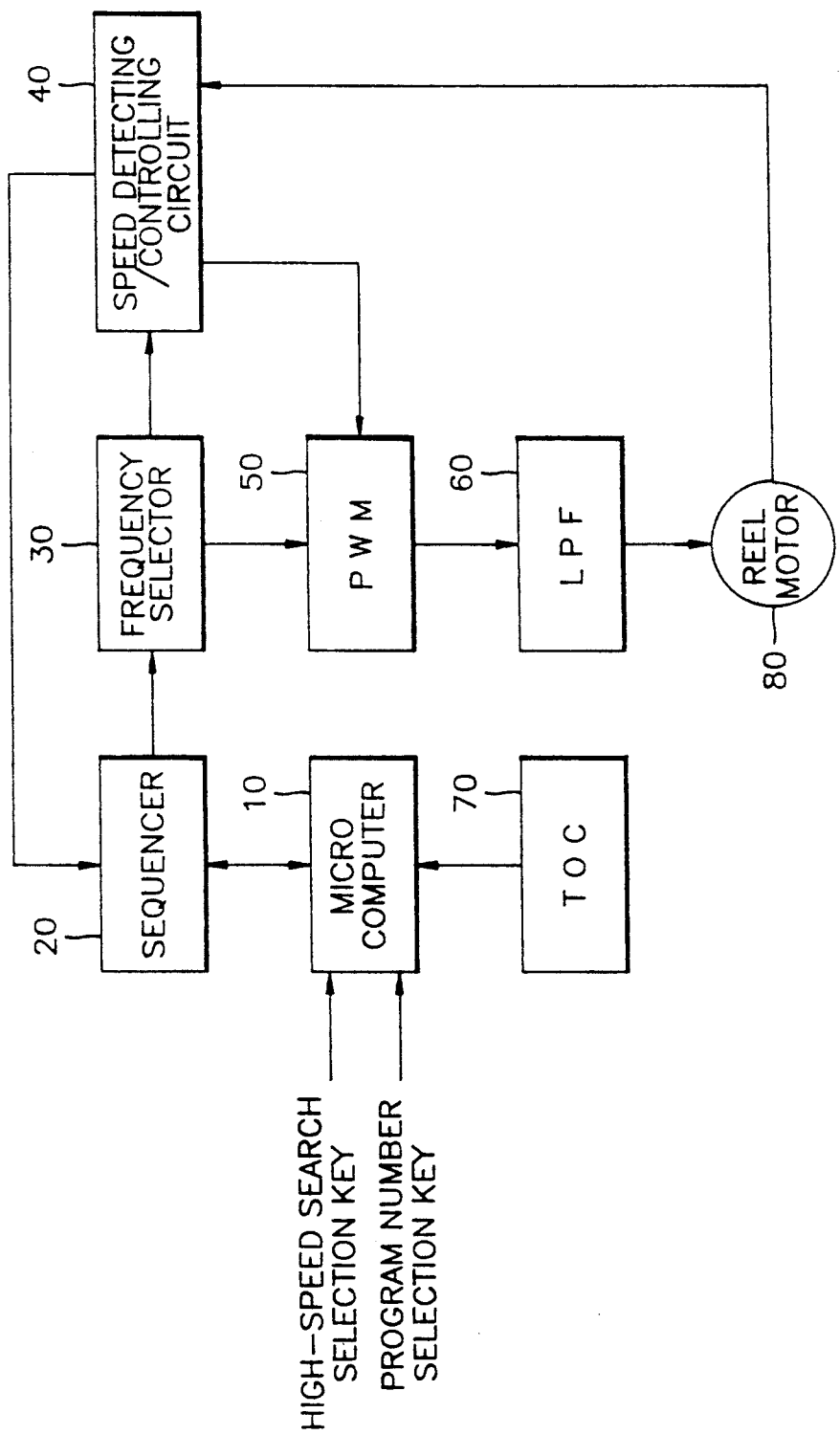
FIG. 3 is a block diagram for implementing the present invention.

In FIG. 3, there is shown a block diagram to which the present invention is applied. First, a microcomputer 10 reads out TOC information and generates a predetermined control signal according to the selection signal of a specific high-speed search mode and a program number selection signal (positional information) which are provided by the user. A sequencer 20 chooses a motor driving frequency and checks PLL (phase locked loop) circuit if it is locked or not in order to transmit a FG (frequency generator) signal to the microprocessor 10, upon the basis of a summation of a take-up reel FG signal and a supply reel FG signal period. A period selector 30 chooses a main count clock which counts the FG period generated from the motor 80 and a corresponding carrier frequency of PWM (pulse width modulation) signal. Then, a speed detecting/controlling circuit 40 detects the speed of reel motor and counts the FG period to decode it and generates a PLL locking signal after decoding the FG signal. A pulse width modulator (PWM) 50 modulates the pulse width of the output of the speed detecting and controlling circuit 40 under the control of said frequency selector 30. Thus, the output of the pulse width modulator 50 is low-pass-filtered in a low pass filter 60 to provide a motor 80 with the low-pass-filtered output, thereby controlling the motor 80 at a predetermined speed.

Therefore, the operation of the invention will now be described in detail according to such configuration as described hereinabove. The flowchart for carrying out features of the invention, the sensing illustration of the tape searching by the FG signal, and the TOC information therefor are shown in FIGS. 4 through 6.

Figure 4:
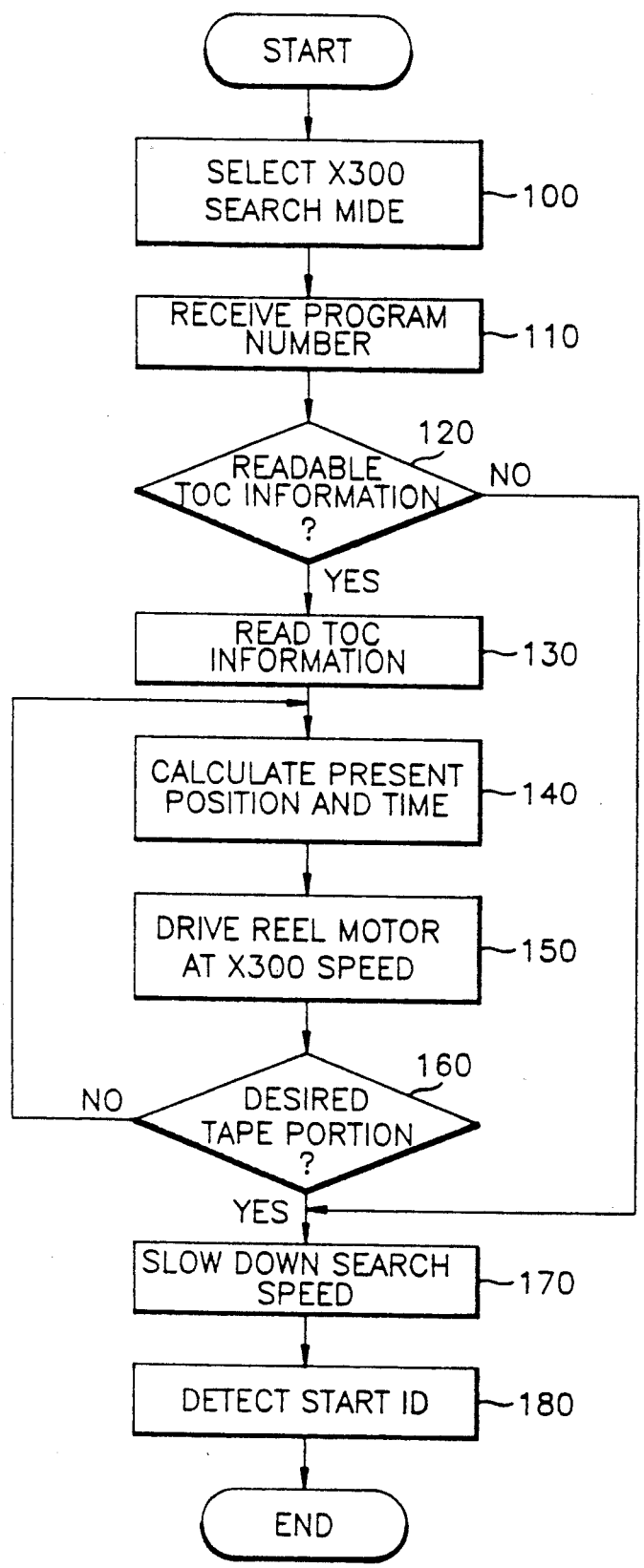
FIG. 4 is a flowchart of the present invention.
Figure 5A:
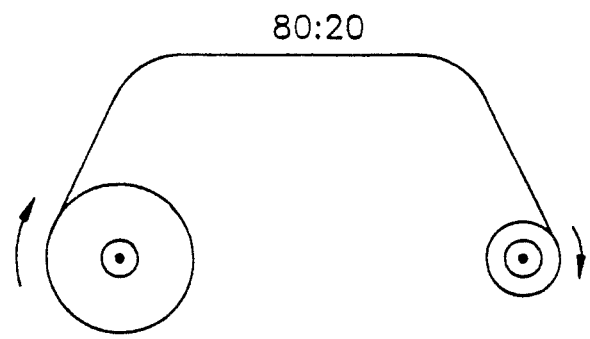
FIGS. 5A-5E are illustrations of tape running time sensing (FG detection) by the detection of FG signal.
Figure 5B:
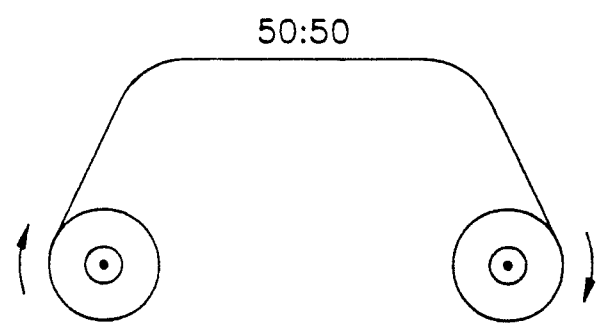
Figure 5C:
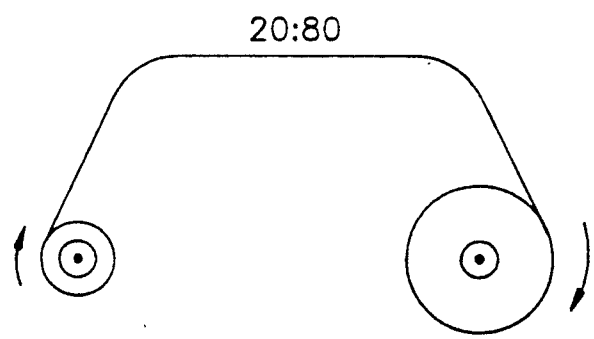
Figure 5D:
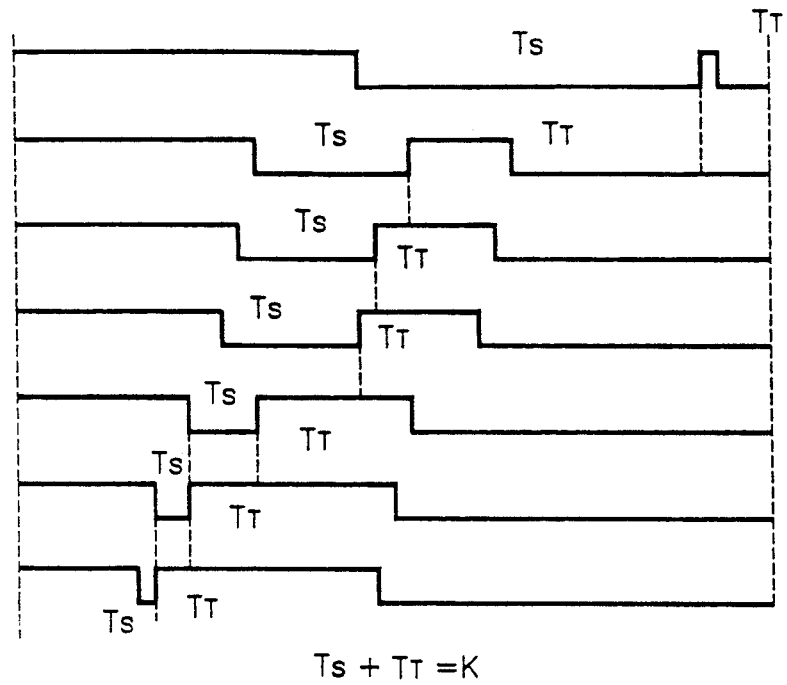
Figure 5E:
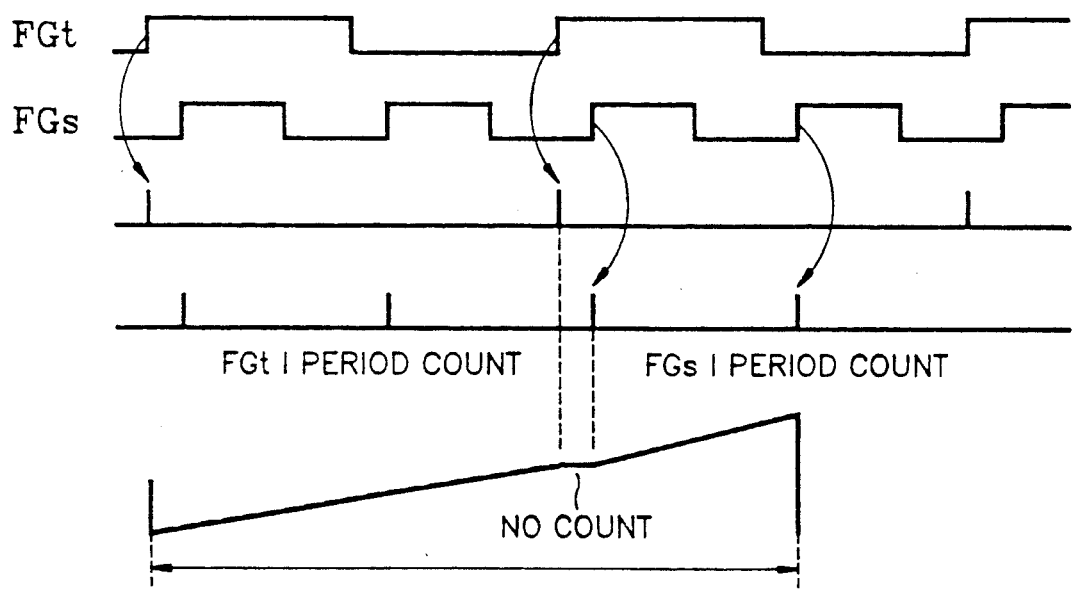

Referring to FIG. 4, the microcomputer 10 receives a signal corresponding to the three-hundred-speed ($\times 300$) FF search mode selected by the user, in a stage 100. The microcomputer 10 then receives a program number (or, tape positional information) desired by the user in a stage 110. Thereafter, the microcomputer 10 checks in a stage 120 if the TOC information is readable under the present operating condition.

If the present condition is judged able to read the TOC information as a result of such checking stage 120, the microcomputer 10 proceeds to a stage 130 to read out the TOC information from a TOC data 70.

As the TOC data 70 contains all the information of the tape, time information for the position at a desired part can be read out. In the embodiment, it is assumed that the TOC information is like FIG. 6.

A present position and time are counted from the FG period value decoded, in a stage 140. In other words, the amount of tape wound onto the take-up reel against the amount of tape wound onto the supply reel is obtained, if the ratio of a value which is decoded by counting the FG periods of both take-up and supply reels is known.

In the case of a tape of 120 minutes, for example, if the amount of tape wound onto the take-up reel is $\frac{1}{4}$ of the amount of tape, the present position of tape is $120 \times (\frac{1}{4}) = 30$. It means that the tape is at the point which corresponds to the 30 minutes of 120 minutes. As the ratio of Ts/Tt (where, Ts is tape wound onto the supply reel and Tt is the tape wound on the take-up reel) undergoes a continuous change according to the condition where the tape is wound onto the reels, it is used for controlling the searching speed. Although it has a constant value K as $Ts + Tt = K$, the constant value K varies according to the speed magnification. In the case of two hundred speed ($\times 200$) play, the constant value K becomes half the constant value K during one-hundred speed ($\times 100$), i.e., $(\frac{1}{2})K$.

However, as the ratio of Ts/Tt represents the amount (time) of tape which is wound onto the reels regardless of how fast the tape is running. Therefore, the tape state (position) can be known by the ratio of Ts/Tt.

Therefore, when the microcomputer 10 senses how fast a search is made, it designates the constant value K corresponding thereto and drives the reel motor 80 so as to take the amount of tape in the ratio of Ts/Tt within the constant value K. At this moment, the sequencer 20 drives the reel motor 80 by the constant value K determined according to each high-speed mode. Based on the constant K, the frequency of main clock pulse required at the pulse width modulator 50 is determined, the clock pulse being used for controlling the power provided to the reel motor so as to control the speed of the reel motor 80. The pulse width is varied at the pulse width modulator 50 according to the FG signal fedback from the reel motor 80. Further, the sequencer 20 senses if the PLL is locked and sends a decoded FG period value to the microcomputer 10.

The frequency selector 30 determines the frequency at which a main counter clock which counts the FG period and a corresponding PWM reference clock. The speed detecting/controlling circuit 40 which is under the control of the frequency selector 30 detects the speed of reel motor 80 by means of counting the FG period, to decode it and then to generate a PLL locking signal.

Thus, the reel motor 80 is controlled so as to take the amount of tape which will be wound onto both reels to the corresponding time position by confirming time information for a desired position from the TOC information given in FIG. 6.

After the stage 140, the reel motor 80 is driven at three-hundred-speed ($\times 300$) search in a stage 150 and it is ascertained in the stage 160 if the amount of tape wound onto the reels is at the value of desired tape position. If the amount is not at the value of desired tape position, it is looped to the stage 140. If the stage 160 is judged as the value of desired tape position, the microcomputer 10 proceeds to a stage 170 to gradually make a slow, precise search from $\times 200$, $\times 100$, $\times 16$, $\times 9$, $\times 5$, $\times 3$ to $\times 2$ speed. The gradually slow, precise search is made as stated above from the neighborhood of desired point, because it is unable for the tape to stop abruptly correctly at the desired point due to the tape inertia, After the stage 170 is performed, a start ID is detected and a high-speed search operation is come to an end in a stage 180.

Since the TOC information is written in the front part of tape, the TOC information of tape becomes unknown if the system is reset by being cut off from power supply or if the tape is another tape during the operation. As tape wound around the middle contains the TOC information at the beginning portion thereof, it must be read again beginning with the start point thereof. Therefore, in the case of the stage 170, the microcomputer 10 may become unable to read the TOC information. In such a case, $\times 200$ speed search will be made when proceeding to the stage 180.

What should be taken into consideration in the case where such a method as stated above is used is that the tape is brought into contact with the drum when a search is made at $\times 300$ or $\times 400$ speed search or at a speed faster than those in a condition where the tape is loaded and that an undesirable influence may be occurred on the head and tape.

Accordingly, it is desirable to draw the drum backward a little in order that it may not be brought into contact with the tape by instrumental mechanism in the case where a search is made, for example, at more than $\times 200$ speed and to bring the drum into contact with the tape when a search is made at less than $\times 200$ speed search. Such a process can be implemented by the control of microcomputer and by the instrumental mechanism.

As described hereinbefore, the present invention is convenient in that it finds out a desired program written in the tape regardless of the relative velocity of the drum even in the search made at more than ×200 speed by searching the digital audio tape by means of TOC and FG period.

While the invention has been particularly shown and described with reference to a preferred embodiment, it will be understood by those skilled in the art that modifications in detail may be made without departing from the spirit and scope of the invention.

What is claimed is:

1. A method of high speed searching a digital audio tape having a table of contents stored thereon, said digital audio tape being on a digital audio tape recorder having tape supply reel, tape take-up reel and a reel motor, said method comprising the steps of:

reading said table of contents information from said digital audio tape for storage in a memory;

inputting a desired search speed and a desired program number into a microcomputer of said digital audio tape recorder;

determining whether said memory contains said table of contents information which can be read;

reading said table of contents information from said memory, if said step of determining results in a positive determination, for input into said microcomputer;

calculating a present tape position of said digital audio tape from data provided by said tape supply reel and said tape take-up reel;

driving said reel motor at said desired search speed;

determining whether a predetermined portion of said digital audio tape has been reached in response to said desired program number and said present tape position;

returning to said calculating step if said predetermined position has not been reached;

driving said reel motor at a speed slower that said desired speed if said step of determining whether said memory contains said table of contents information which can be read determines that said table of contents information can not be read or if said step of determining whether a predetermined portion of said digital audio tape has been reached determines said predetermined portion has been reached; and detecting program identification during said step of driving said reel motor at a slower speed, said program identification being representative of said desired program number input to said microcomputer.

2. The method as claimed in claim 1 wherein said step of driving said reel motor at a slower speed comprises:

reducing said driving speed of said reel motor, if said predetermined tape position has been reached, from said desired search speed to a speed 200 times a playback operating speed of said reel motor; and gradually reducing said driving speed from said 200 times speed in predetermined steps until said program identification is detected.

3. The method as claimed in claim 2 wherein said step of driving said reel motor at a slower speed comprises:

driving said reel motor at a speed 200 times a playback operating speed of said reel motor if said table of contents information can not be read; and gradually reducing said driving speed from said 200 times speed in predetermined steps until said program identification is detected.

4. The method as claimed in claim 3 wherein said step of driving said reel motor at a slower speed further comprises:

driving said reel motor at said speed 200 times a playback operating speed of said reel motor if said table of contents information can not be read; and gradually reducing said driving speed from said 200 times speed in predetermined steps until said program identification is detected.

* * * * *